(12) United States Patent
Ohnuma

(10) Patent No.: US 6,301,021 B1
(45) Date of Patent: *Oct. 9, 2001

(54) MULTI-BEAM OPTICAL APPARATUS AND IMAGE FORMING APPARATUS HAVING THE SAME

(75) Inventor: Satoshi Ohnuma, Kawasaki (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,976

(22) Filed: Jul. 20, 1998

(30) Foreign Application Priority Data

Jul. 25, 1997 (JP) .................................... 9-200069

(51) Int. Cl.$^7$ ...................................... H04N 1/04
(52) U.S. Cl. ............................. 358/475; 358/474
(58) Field of Search ................... 358/475, 474, 358/409, 408, 481, 505

(56) References Cited

U.S. PATENT DOCUMENTS

| 4,561,717 | 12/1985 | Kataoka et al. | 350/6.8 |
| 4,916,547 | 4/1990 | Katsumata et al. | 358/300 |
| 4,962,312 | 10/1990 | Matuura et al. | 250/236 |
| 5,072,244 | 12/1991 | Aoki et al. | 346/160 |
| 5,291,223 | 3/1994 | Ogane et al. | 346/108 |
| 5,818,506 | * 10/1998 | Amaguchi | 347/259 |

FOREIGN PATENT DOCUMENTS

| 0 291 738 | 11/1988 | (EP) . |
| 5-47084 | 12/1993 | (JP) . |

* cited by examiner

Primary Examiner—Jerome Grant, II
Assistant Examiner—Negussie Worku
(74) Attorney, Agent, or Firm—Foley & Lardner

(57) ABSTRACT

A light exposure device for a color copier has a plurality of laser light sources for emitting laser beams on the basis of image signals of separated colors. These laser beams are continuously deflected by a polygon mirror to allow the surfaces of the photosensitive drums which are provided correspondingly to the respective light sources to be scanned with the laser beams. Through the scanning of the laser beams by the polygon mirror, electrostatic latent images corresponding to the respective colors are formed on the surfaces of the photosensitive drums. At this time, a portion of a laser beam emitted from a reference light source is received by a light receiving element and, by doing so, a sync signal is obtained. Based on the sync signal it is possible to control write timings of the laser beams emitted from the laser beam sources. Further, register patterns output onto a transfer belt at that time are read out by an image sensor so that a shift relative to the patterns is detected and, by doing so, the write timings of the laser beams are so corrected as to bring the relative shift to zero.

23 Claims, 6 Drawing Sheets

MULTI-BEAM OPTICAL APPARATUS AND IMAGE FORMING APPARATUS HAVING THE SAME

BACKGROUND OF THE INVENTION

The present invention relates to a multi-beam optical apparatus for guiding laser beams which are exited from a plurality of light sources onto targets and, in particular, a multi-beam optical apparatus for controlling write timings relative to respective targets by controlling the exiting timing of each laser beam, and an image forming apparatus equipped with the multi-beam optical apparatus.

Generally, as the multi-beam optical apparatus there is known a light exposure device incorporated into an image forming apparatus such as a color copying machine, etc. The light exposure device comprises a plurality of light sources exiting laser beams based on color-separated image signals, a plurality of mirrors and of lenses conducting laser beams which are exited from the respective laser beam sources onto the surfaces (hereinafter referred to simply as drum surfaces) of photosensitive drums prepared for respective colors, and a plurality of polygon mirrors provided correspondingly to the respective laser beam sources and allowing the laser beams which are to be conducted to the respective drum surfaces to be deflected along the directions (horizontal directions) of the rotation shafts of the respective rotation drums to scan the drum surfaces.

In the type of a light exposure device, in order to detect the timings of writing the respective laser beams in the horizontal scanning directions, portions of the laser beams reflected on the respective polygon mirrors are reflected to corresponding reflection mirrors, so that they are received by a corresponding number of light receiving elements. And the timings in which writings are effected by the respective laser beams are controlled based on the laser beams-received by the light receiving elements.

As understood from the above, in the light exposure device of the conventional color copier, it is necessary to, as a structure for detecting the timings of effecting writings by the respective laser beams in the horizontal direction, provide a plurality of reflection mirrors and of light receiving elements so as to correspond to the corresponding mirrors. For this reason, many more components parts are required for the light exposure device and, in addition, the manufacturing cost becomes high.

Further, due to the presence of these many component parts involved, it takes a lot of time to adjust the optical paths of the laser beams conducted to the respective component parts and also much time is required to assembly the light exposure device.

BRIEF SUMMARY OF THE INVENTION

It is accordingly the object of the present invention to provide a multi-beam optical apparatus capable of manufacturing a low-cost unit of simpler structure and readily and positively controlling optical paths of laser beams and an image forming apparatus equipped with the multi-beam optical apparatus.

According to the present invention, there is provided a multi-beam optical apparatus comprising:

a plurality of light sources for emitting laser beams;

scanning means for scanning image carrier means by deflecting the laser beams emitted from the light sources;

light receiving means for receiving one of the laser beams which are emitted from the light sources and scan the image carrier means through deflection;

sync signal generating means for generating a sync signal based on the light receiving means;

first control means for, in order to form predetermined pattern images on the image carrier means, enabling the laser beams to be emitted from the light sources in synchronism with the sync signal generated from the sync signal generating means;

detecting means for detecting amounts of shifts relative to pattern images; and second control means for controlling the timings of emitting the laser beams from the light sources on the basis of a result of detection made by the detecting means.

According to the present invention, there is further provided a multi-beam optical apparatus comprising:

a plurality of light sources for emitting laser beams;

scanning means for scanning a plurality of image carriers provided correspondingly to the light sources by deflecting the laser beams emitted from these light sources;

light receiving means for receiving one of the laser beams which are emitted from the light sources and scan the image carriers through deflection;

sync signal generating means for generating a sync signal based on the laser beam received by the light receiving means;

first control means for, in order to form predetermined pattern images on the corresponding image carriers, enabling the laser beams to be emitted from the light sources in synchronism with the sync signal generated from the sync signal generating means;

detecting means for detecting amounts of shifts relative to pattern images; and second control means for controlling timings of emitting the laser beams from the corresponding light sources on the basis of a result of detection made by the detecting means.

According to the present invention, there is still further provided an image forming apparatus comprising:

a plurality of light sources for emitting laser beams based on an image signal;

scanning means for scanning image carrier means by the laser beams emitted from the light sources to form latent images on the image carrier means;

developing means for supplying developing agents to the latent images to form developing agent images on the image carrier means;

transferring means for transferring the developing agent images developed by the developing means to a transfer medium;

fixing means for fixing the developing agent images which are transferred to the transfer medium;

light receiving means for receiving one of the laser beams which are emitted from the light sources and scanned by the scanning means;

sync signal generating means for generating a sync signal which are obtained based on the laser beam received by the light receiving means;

first control means for enabling the laser beams which are based on pattern signals to be emitted from the light sources in synchronism with the sync signal generated by the sync signal generating means, the pattern signals being initially prepared as predetermined pattern images to be formed on the image carrier means;

detecting means for detecting amounts of shifts relative to pattern images; and second control means for controlling timings for emitting the laser beams from the light sources on the basis of a result of detection made by the detecting means.

According to the present invention, there is still further provided an image forming apparatus comprising:

a plurality of light sources for emitting laser beams based on an image signal;

scanning means for scanning image carriers corresponding to the light sources by deflecting the laser beams emitted from the light sources to form latent images on the image carriers;

developing means for supplying developing agents to corresponding latent images to form developing agent images on the image carriers;

conveying means, having a conveying surface running along the image carriers, for conveying a transfer medium on the conveying surface while holding the medium relative to the image carriers;

first transfer means for transferring a plurality of developing agent images which are developed by the developing means to the conveying medium in a registering relation;

fixing means for fixing, to the medium, developing agent images transferred by the first transfer means in the registering fashion;

light receiving means for receiving one of laser beams which are emitted from the light sources and scanned by the scanning means through deflection;

sync signal generating means for generating a sync signal based on the laser beam received by the receiving means;

first control means for enabling the laser beams which are based on the pattern signal to be emitted from the light sources in synchronism with the sync signal generated by the sync signal generating means, the pattern signal being initially prepared so as to form predetermined pattern images on the image carriers;

second transfer means for directly transferring, to the conveying surface of the conveying means, pattern images formed on the image carriers on the basis of the control effected by the first control means;

detecting means, provided opposite to the conveying surface, for detecting a relative shift among the pattern images transferred by the second transfer means to the conveying surface; and second control means for controlling timings of emitting the laser beams from the light sources on the basis of a result of detection by the detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will be explained below with reference to the accompanying drawing.

Figure 1:
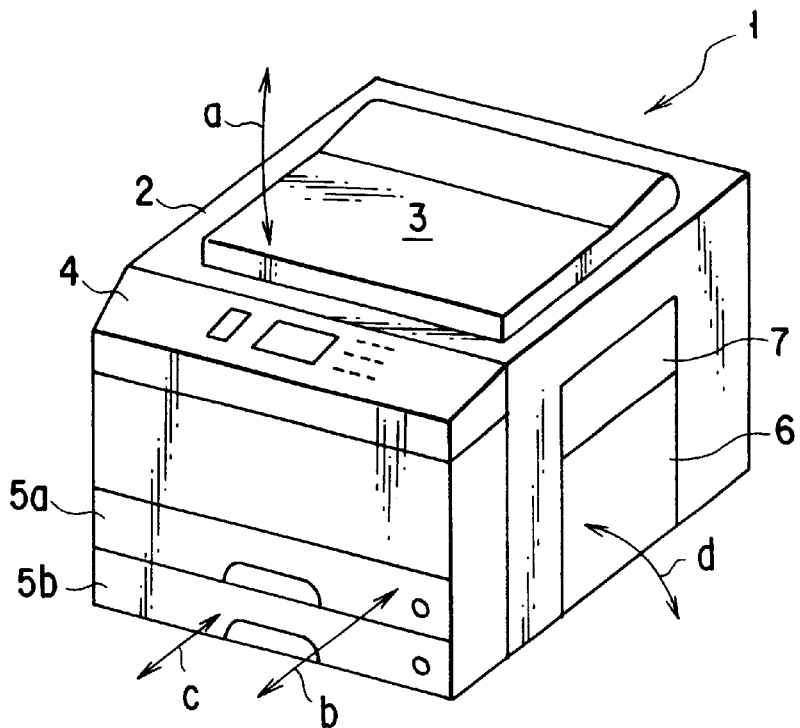
FIG. 1 is a perspective view, as seen from a right diagonal front direction, showing a copier according to an embodiment of the present application.
Figure 2:
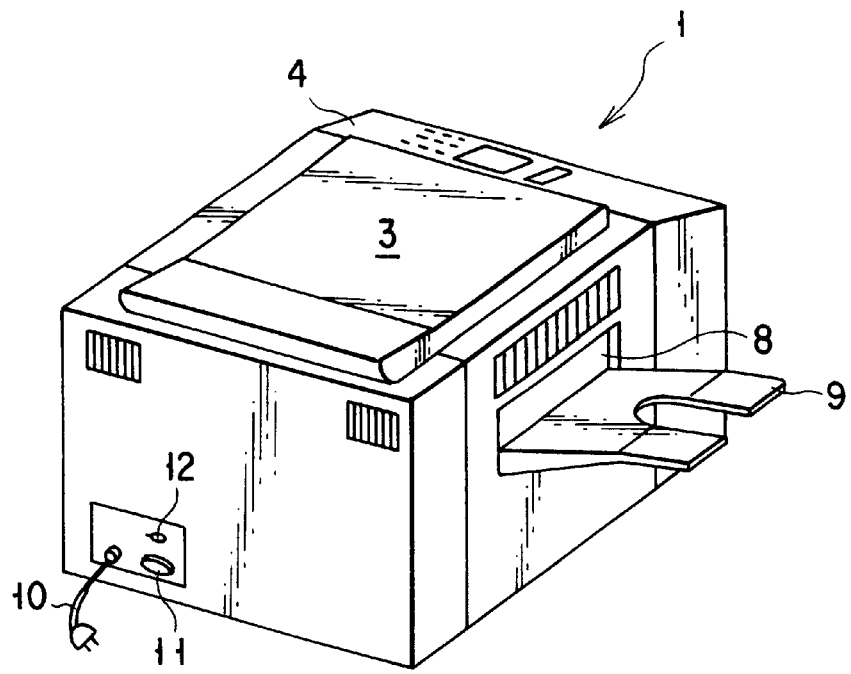
FIG. 2 is a perspective view, as seen from a left diagonal rear direction, showing the copier.

FIG. 1 is a perspective view, as seen from a right diagonal front side, showing a color copying machine 1 (hereinafter referred to simply as a copier) serving as an image forming apparatus of the present invention and FIG. 2 is a perspective view, as seen from a left diagonal rear side, showing the copier 1. With reference to FIGS. 1 and 2 showing an outer appearance of the copier 1 an explanation will be give below about the general structure of the copier 1.

As shown in FIG. 1, a document rest 2 is provided at the top section of the copier 1 to place a document on the document rest. Over the document rest 2, a document pressing cover 3 is provided to press the document in place and can be opened/closed in a direction as indicated by arrows in FIG. 1.

An operator panel 4 is provided at a front upper side section of the copier 1. A plurality of operation keys, such as a copy start switch, are provided at the operation panel 4 so as to set and execute various kinds of instructions on the copier 1.

Sheet cassettes 5a, 5b are provided at a lower zone of the copier 1 to receive recording sheets, by size, in plural numbers, the recording sheets being of such a type as to allow on image to be transferred thereto. The sheet cassettes 5a, 5b can be inserted/withdrawn into/out of the copier 1 along the directions indicated as arrows b and c in FIG. 1.

An access cover 6 and sheet guide 7 are provided at the right surface side of the copier, the former being provided for handling jamming of sheets and the latter for manually supplying sheets. The access cover 6 is so provided as to allow it to be opened/closed relative to the copier 1 in a direction of arrows d in FIG. 1. The sheet guide 7 is opened and closed as a necessity arises.

As shown in FIG. 2, a discharge outlet 8 and discharge tray 9 are provided on the left surface side of the copier 1. The discharge outlet 8 is used to discharge a recording sheet with an image formed thereon. The discharge tray 9 is used to receive those recorded sheets discharged via the discharge outlet 9. The discharge tray 9 is detachably provided on the copier 1.

A power supply cord 10, I/F connector 11 and I/F connector 12 are provided on the back surface side of the copier 1. The power supply code 10 supplies an electric power to the copier 1, the I/F connector 11 is connected to an external device, such as a personal computer, and the I/F connector 12 is connected to a facsimile equipment.

Figure 3:
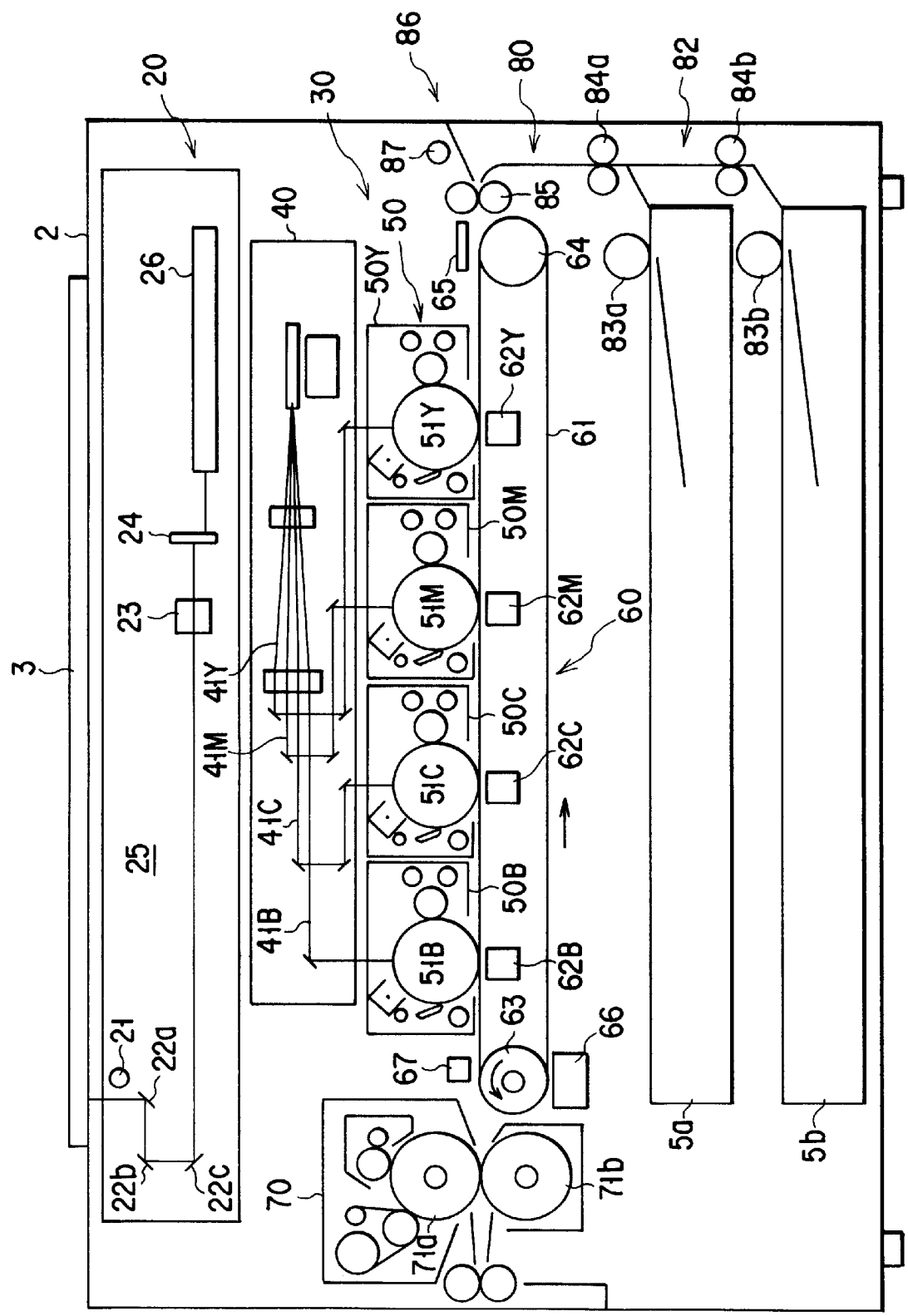
FIG. 3 is a cross-sectional view showing an inner arrangement of the copier of FIG. 1 in more detail.

FIG. 3 is a cross-sectional view diagrammatically showing an internal arrangement of the copying machine 1. The copier 1 can be broadly grouped into:

(1) A document reading section 20 for optically reading out a document image and converting it to a digital signal;

(2) An image forming section 30 for forming an image on a recording sheet on the basis of the digital signal and with the use of an electrophotographic system; and (3) A sheet conveying section 80, including the sheet cassettes 5a, 5b and manual sheet feeding section as will be set out below, for supplying the recording sheet to the image forming section 30.

The image reading section 20 has an optical system 25 comprising an illumination lamp 21 for illuminating a document, not shown, placed on the document rest 2, reflection mirrors 22a, 22b, 22c for sequentially reflecting a reflection light beam coming from the document, and an image forming lens 23, a light receiving element 24, such as a CCD, for photoelectrically converting the reflected light beam coming from the optical system 25 to an electric signal, and an image processing device 26 for subjecting the photoelectrically converted signal to color separation to provide image signals of the respective colors yellow (Y), magenta (M), cyan (C) and black (B).

The image forming section 30, utilizing the so-called photoelectric system, utilizes a light exposure device 40 for exposing, with light, the surfaces (hereinafter referred to simply as drum surfaces) of later-described photosensitive drums 51Y, 51M, 51C, 51B provided for the respective colors (Y, M, C, B), an image forming mechanism 50 including the photosensitive drums 51Y, 51M, 51C and 51B for the respective colors, a transfer mechanism 60, and a fixing device 70.

The transfer mechanism 60 has a transfer belt 61 for conveying the recording sheet along the drum surfaces of the respective photosensitive drums 51Y, 51M, 51C, 51B. The transfer belt 61 is stretched around and between a drive roller 63 and a driven roller 64 such that all these photosensitive drums are set in rolling contact with the transfer belt. These rollers are located in a spaced-apart relation. The drive roller 63 is rotated, by a motor not shown, in a direction of an arrow in FIG. 3. The transfer belt 61 is run at a predetermined speed in an endless fashion in a direction indicated by an arrow in FIG. 3. A predetermined tension force is applied, by a pressure-applying mechanism not shown, to the driven roller 64 in a direction away from the drive roller. 63, so that the transfer belt 61 is stretched taut.

Transfer devices 62Y, 62M, 62C, 62B are provided inside the transfer belt 61. The transfer devices 62Y, 62M, 62C, 62B are arranged below, and opposite to, the photosensitive drums 51Y, 51M, 51C, 51B, respectively, with the upper flight of the transfer belt 61 interposed. A sheet feed-in guide device 65, cleaning device 66 and later-described image sensor 67 are provided in given places relative to the transfer belt 61, the sheet feed-in guide device 65 feeding the recording sheet on the transfer belt 61 in correct order and the cleaning device 66 cleaning the surface of the transfer belt 61.

The image forming mechanism 50 is provided above the transfer mechanism 60. In the image forming mechanism 50, image forming units 50Y, 50M, 50C and 50B are equidistantly arranged so as to form an image of any of the colors yellow (Y), magenta (M), cyan (C) and black (B) as seen from the right side in FIG. 3. The respective image forming units 50Y, 50M, 50C, 50B are of such a type as to have a similar structure. They form an image of any of such colors through the known photoelectric process. The respective image forming units 50Y, 50M, 50C, 50B have photosensitive drums 51Y, 51M, 51C, 51B, respectively. Although, as the image carriers, the four photosensitive drums are provided, there is also the case where these four photosensitive drums are handled as a single image carrier means.

The light exposure device 40 is arranged above the image forming mechanism 50 and has laser light sources 42Y, 42M, 42C, 42B (see FIGS. 5 and 6) driven on the basis of an image signal of any of colors prepared by the image processing device 26. The respective laser light sources 42Y, 42M, M2C, 42B exit laser beams 41Y, 41M, 41C, 41B corresponding to the respective colors based on those color-separated image signals. The laser beams exited from the respective laser sources are directed toward the drum surfaces of the photosensitive drums 51Y, 51M, 51C, 51B in the image forming units 50Y, 50M, 50C, 50B past a laser-described optical system to illuminate these drum surfaces. By doing so, those electrostatic latent images corresponding to the respective colors are formed on the corresponding drum surfaces.

Figure 4:
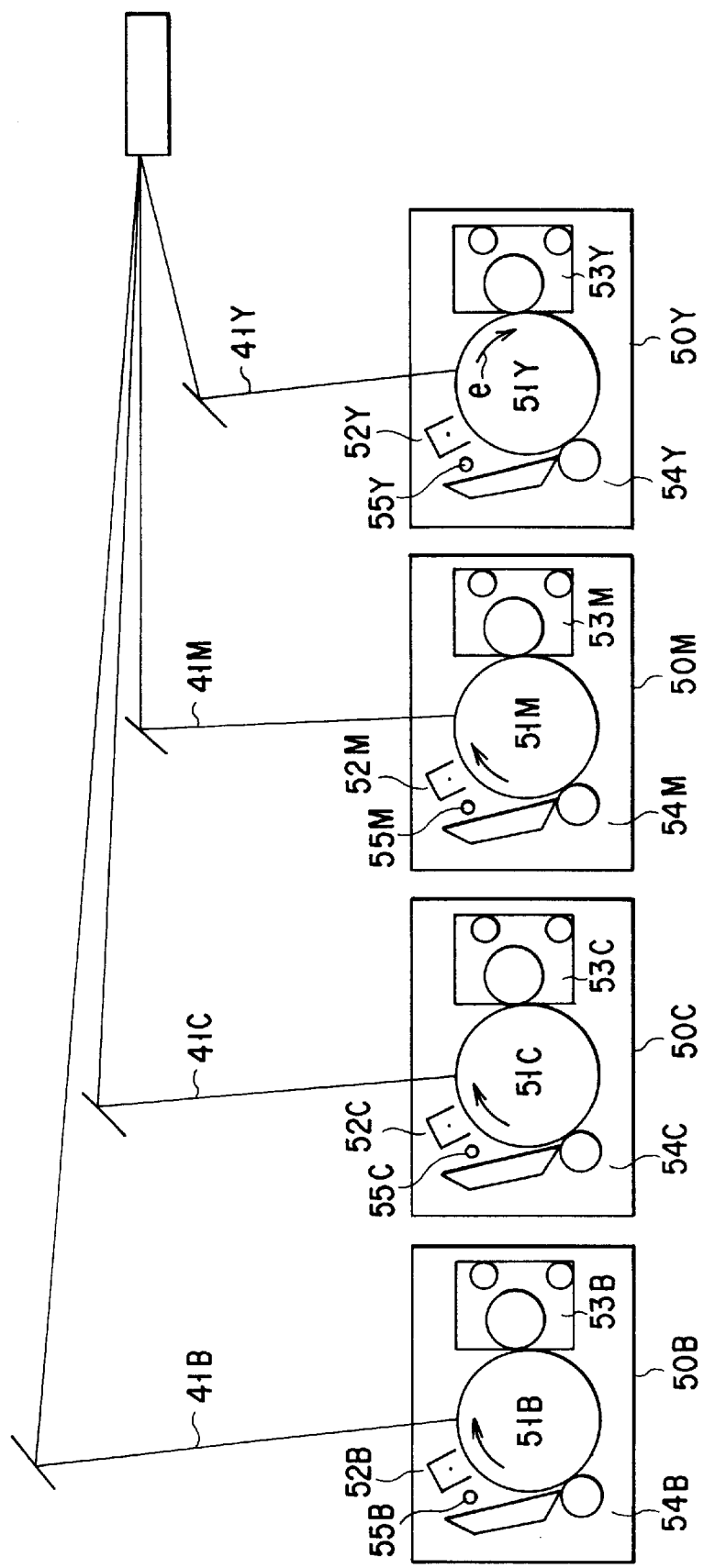
FIG. 4 is a view, partly enlarged, diagrammatically showing a major section of FIG. 3.

As set out in more detail in FIG. 4, around the photosensitive drums 51Y, 51M, 51C, 51B, charging devices 52Y, 52M, 52C, 52B, developing devices 53Y, 53M, 53C, 53B, transfer devices 62Y, 62M, 62C, 63B (see FIG. 3), cleaning devices 54Y, 54M, 54C, 54B and discharging devices 55Y, 55M, 55C, 55B, respectively, are provided along the rotation directions of the photosensitive drums 51Y, 51M, 51C, 51B. The charging device charges the corresponding drum surface to a predetermined potential and the developing device is supplied with a developing agent of a color corresponding to an electrostatic latent image formed on the corresponding drum surface and develops the latent image. That is, the laser beams 41Y, 41M, 41C, 41B of those colors guided via the light exposure device 40 are guided to the drum surfaces charged by the charging devices 52Y, 52M, 52C, 52B to predetermined potentials and those electrostatic latent images corresponding to the respective colors are formed on the corresponding drum surfaces. And the developing agents of the respective colors are supplied by the developing devices 53Y, 53N, 53C, 53B to the electrostatic latent images of the respective drum surfaces, so that these latent images are converted to visual images.

The fixing device 70 has a pair of heating rollers 71a, 71b, upper and lower. These rollers are heated to a predetermined temperature and pressed under a predetermined pressure and allow the sheet to pass therebetween, so that the developing agent's image on the sheet is melted to fix it to the sheet.

The sheet conveying section 80 has the sheet cassettes 5a, 5b each with a plurality of sheets held therein. The respective sheet cassettes 5a, 5b each store a predetermined size of recording sheets and set below the transfer mechanism 60. Further, a sheet feeding section 80 has a sheet feeding section 82 for allowing the recording sheet which is taken out from the sheet cassette (5a, 5b) to be conveyed toward the image forming section 30.

The sheet feeding section 82 has pickup rollers 83a, 83b for picking up the recording sheet one by one from the sheet cassette (5a, 5b), conveying roller pairs 84a, 84b for conducting the picked-up recording sheet onto the transfer belt 61, and a aligning roller pair 85 for adjusting a timing in which the recording sheet is fed. A manual sheet feeding device 86 is provided upstream of the aligning roller pair 85 to allow the recording sheet which is manually fed via the sheet guide 7 (see FIG. 1) to be guided onto the transfer belt 61. With the sheet guide 7 set in an opened state, a sheet is placed on the sheet guide 7 and a pick-up roller 87 is rotated to allow the leading edge of the recording sheet to be sent into the aligning roller 85.

An explanation will be given below about the operation of the copier 1 thus arranged.

First, when a copy start signal is input to the copier via the operator panel 4, the document reading section 20 is started, so that the illumination lamp 21 is lighted and the optical system 25 operates. Light reflected from the document is received by the light receiving element 24 past the optical system 25 and, being converted to an electric signal, fed to the image processing device 26.

The image signal thus fed is separated by the image processing device 26 into color image signals corresponding to yellow, magenta, cyan and black. These color image signals are sent to a writing image processing device, not shown.

The signals coming from the writing image processing device are sent to the light exposure device 40. At the same time, the photosensitive drums 51Y, 51M, 51C, 51B, transfer belt 61 fixing device 70, etc., are started.

The recording sheet held in the sheet cassette (5a, 5b) or the recording sheet manually fed via the manual sheet feeding device 86 is picked up by the pick-up roller (83a, 83b) or pick-up roller 87 in the manual sheet supply device. The recording sheet picked up by the picked-up roller (83a, 83b) is conveyed by the conveying roller pair (84a, 84b,) to the aligning roller 85 where its sheet supplying timing is adjusted. And the recording sheet is sent onto the transfer belt 61.

The image signals from the writing image processing device are sent to the light exposure device 40 and exited as laser beams 41Y, 41M, 41C, 41B corresponding to the respective colors. At this time, the exiting timings of the laser beams exited from the respective laser light sources 42Y, 42M, 42C, 42B, that is, the writing timings, are adjusted by the method as will be set out below.

For example, the laser beam 41Y for a yellow image is exited from the light beam source 42Y by energizing the yellow laser light source 42Y corresponding to the yellow image signal by means of the light exposure device 40. The drum surface of the photosensitive drum S1Y, being uniformly charged by the charging device 52Y, is subjected to light exposure by the laser light beam 41Y to form an electrostatic latent image corresponding to the yellow image signal.

The photosensitive drum 51Y is rotated in a direction of an arrow e (see FIG. 4) and the electrostatic latent image on the photosensitive drum 51Y is moved by the rotation of the photosensitive drum 51Y. The latent image on the photosensitive drum is developed by the developing device 53Y to provide a yellow developing agent image.

The yellow image is transferred by the transfer device 62Y onto the recording sheet fed on the transfer belt 61.

The yellow developing agent left untransferred on the surface of the photosensitive drum 61Y is cleaned by a corresponding cleaning device 54Y off the drum surface.

A remnant potential on the photosensitive drum 51Y is uniformly lowered by being illuminated by a discharging device 55, thus being in readiness for the next photoelectric process.

For the magenta, cyan and black images, the corresponding image signals are sent to the light exposure device 40, the corresponding laser beam sources 42M, 42C and 42B are energized in accordance with the respective image signals to allow the laser beams 41M, 41C, 41B to be exited, and image of the corresponding colors are formed through the same process as that of the yellow image forming means 50Y in the respective image forming means.

In the above-mentioned image forming process, the recording sheet is conveyed on the transfer belt 61, the respective color images are sequentially transferred, the image-transferred sheet is separated as a forced separation, either around the curvature of the drive roller 63 or by a separation claw, not shown, off the transfer belt 61 and sent to the fixing device 70.

In the fixing device 70, the resultant sheet is image-fixed either through the application of heat or under pressure, and the fixed sheet is discharged via the discharge outlet 8 onto the discharge tray 9 provided outside the copier 1.

Figure 5:
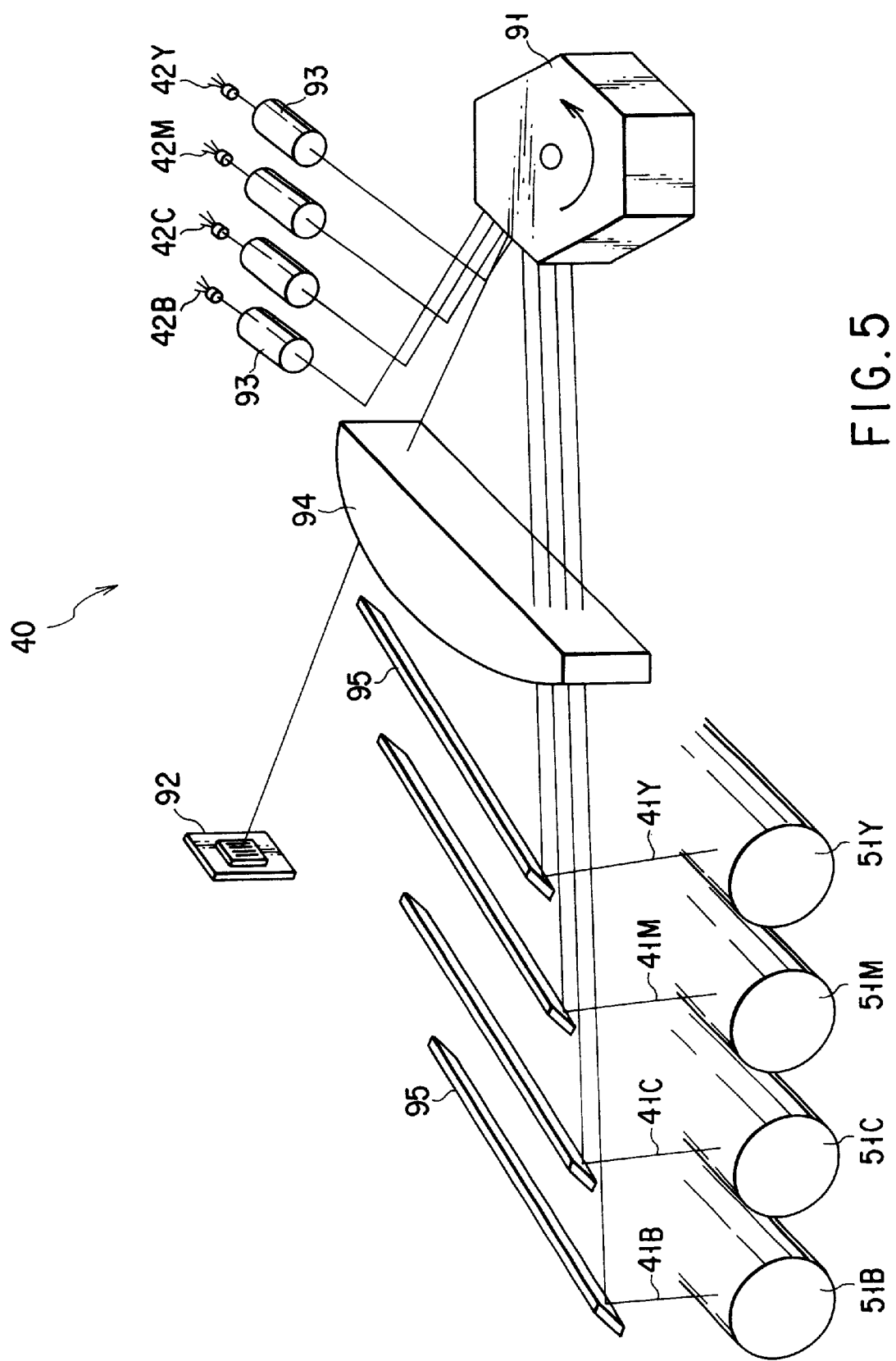
FIG. 5 is a perspective view diagrammatically showing a major section of a light exposure device incorporated into the copier of FIG. 3.
Figure 6:
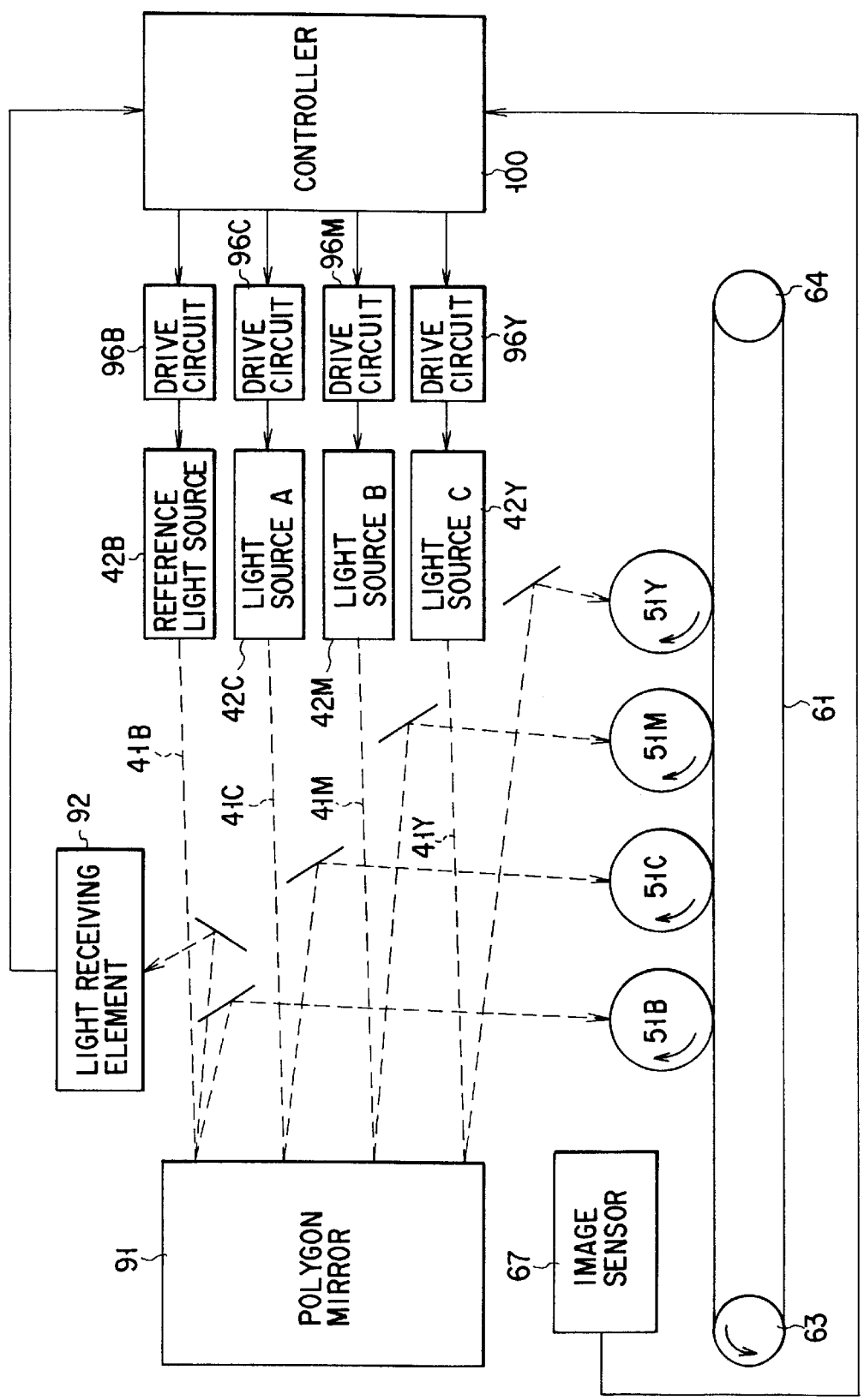
FIG. 6 is a block diagram showing a control system of the light exposure device of FIG. 5.

With reference to FIGS. 5 and 6, an explanation will be given below, in more detail, about the above-mentioned light exposure device 40 serving as the multi-beam optical apparatus of the present invention.

As shown in FIG. 5, the light exposure device 40 has a plurality of laser light beam sources 42Y, 42M, 42C, 42B energized in accordance with the colorseparated image signals. The respective laser light beam sources 42Y, 42M, 42C, 42B exit laser light beams 41Y, 41M, 41C, 41B on the basis of image signals of corresponding colors.

Further, the light exposure device 40 has one polygon mirror 91 for allowing the laser light beams 41Y, 41M, 41C, 41B which are exited from the corresponding laser light sources 42Y, 42M, 42C, 42B to be continuously and periodically deflected and these beams to be directed onto the surfaces of the respective photosensitive drums 51Y, 51M, 51C, 51B, so that scanning can be made on the drum surfaces in the drum's rotation directions, that is, in the horizontal scanning directions.

Further, the light exposure device 40 includes a light receiving element 92 for receiving a portion of the laser beam at a position deflected by the polygon mirror 91 away from the image area, the laser beam being exited from the black laser light source 42B serving as a reference light source.

The laser beams 41Y, 41M, 41C, 41B are exited from the laser beam sources 42Y, 42M, 42C, 42B in a way to correspond to the color-separated image signals and are conducted to the polygon mirror 91 past pre-deflection lenses 93. The polygon mirror 91 provides a multi-face mirror at its outer periphery and, being rotated at a predetermined speed in a direction of an arrow in FIG. 5, reflects all the laser beams and periodically deflected. The direction in which the laser beams are deflected by the polygon mirror 91 corresponds to the horizontal scanning direction, that is, the direction corresponding to the rotation axis along which the photosensitive drum is rotated.

The respective laser beams 41Y, 41M, 41C, 41B deflected by the polygon mirror 91, being passed through a post-deflection lens 94, are directed, past corresponding reflection mirrors 95, to the surfaces of the photosensitive drums 51Y, 51M, 51C, 51B for illumination. With the rotations of the respective photosensitive drums 51Y, 51M, 51C, 51B, the respective drum surfaces are scanned, with the corresponding color laser beams, in the horizontal scanning direction and in the vertical scanning direction. In this way, electrostatic latent images are created on the drum surfaces in a way to correspond to the color-separated image signals.

It is to be noted that the portion of the laser beam 41B exited from the laser beam source 42B, being passed through the polygon mirror 91 and post-deflection lens 94, is received by the light receiving element 92 to obtain a horizontal scanning sync signal as will be described later below.

The electrostatic latent images of the corresponding colors formed on the respective surface, being developed as already set out above, are sequentially transferred to the recording sheet with the developing agents deposited thereon and are fixed, so that a color image is created on the recording sheet.

The surface accuracy and mounting angle of an optical member, such as the pre-deflection lens 93, post-deflection lens 94 and reflection mirror 95, as well as the timing in which writing is effected (scanning is started) in a horizontal direction with the laser beams 41Y, 41M, 41C, 41B from the laser beam sources 42Y, 42M, 42C and 41B, are adjusted with high accuracy, so that an accurate registration is achieved among the developing agent images of respective colors on the recording sheet and hence any image defect, such as a color misregister, never emerges on an output color image.

If any components part is somewhat tilted due to a variation in surface accuracy, mounting angle, etc., of optical members involved, then for example the timing in which writing is made by the laser beam in a horizontal direction is shifted to cause the shifting of the electrostatic latent images on the respective photosensitive drums, so that the image defect, such as a color misregister, emerges on the output image. According to the present invention, therefore, as will be set out below, the writing timings of the laser beams from the respective laser beam sources 42Y, 42M, 42C, 42B are so adjusted as to prevent such misregister emerging on the output image.

Here, with reference to a block diagram as shown in FIG. 6, an explanation will be given about a control system in the light exposure device 40. The control system of the light exposure device 40 includes a controller 100 serving as a control means of the present invention. To the control circuit 100 are connected those drive circuits 96Y, 96M, 96C, 96B adapted to drive laser beam sources 42Y (beam source C), 42M (beam source B), 42C (beam source A) and 42B (reference beam source). The above-mentioned light receiving element 92 and image sensor 67 are connected to the controller 100. The image sensor 67 is located at a place above, and spaced a given distance apart from the transfer belt 61 and detects a later-described register pattern transferred to the transfer belt 61.

An explanation will be made about the method for adjusting the writing timings of the laser beams from the respective laser beam sources 42Y, 42M, 42C, 42B.

Based on an image signal including register patterns initially prepared for timing adjustment, the controller 100 generates control signals to the drive circuits 96Y, 96M, 96C, 96B at a power-ON time, at a time of the ending of a warm-up operation immediately following the stopping of the device or at any arbitrary time at which the images are being output. The respective drive circuits energize the respective laser beam sources 42Y, 42M, 42C, 42B on the basis of the corresponding control signals.

Figure 7:
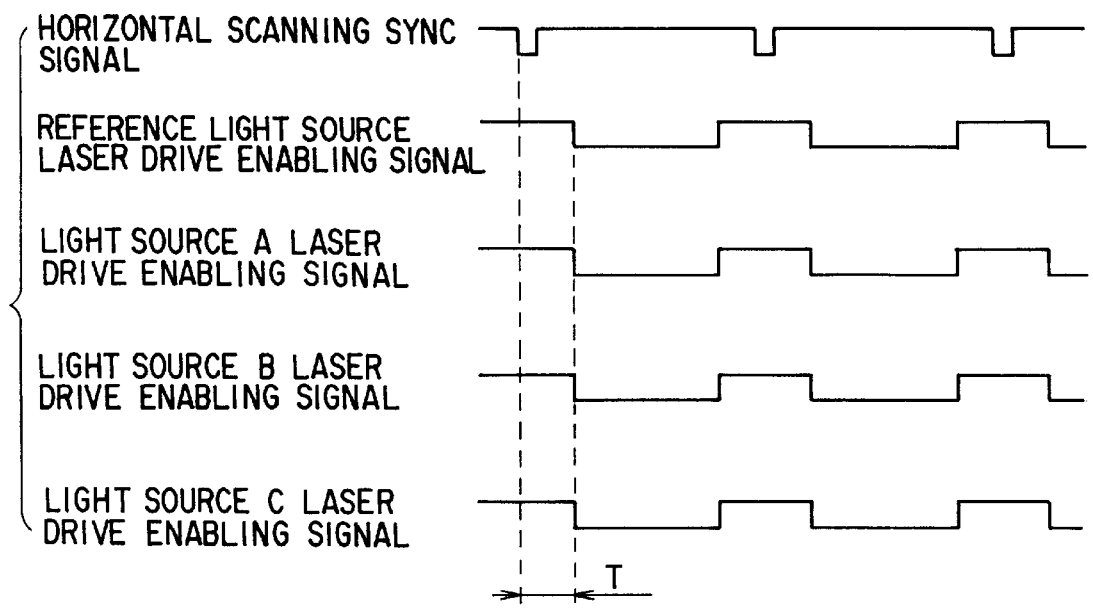
FIG. 7 is a timing chart showing timings of writing laser beams on the basis of a horizontal scanning sync signal.

At this time, the controller 100 receives the laser beam signal coming past the light receiving element 92 from the post-deflection lens 94 after it has been exited from the reference beam source 42B and deflected by the pre-deflection mirror and then polygon mirror 91 and obtains a horizontal scanning sync signal (hereinafter referred to simply as a sync signal) as shown in FIG. 7. And the controller 100 supplies laser drive enabling signals to the respective drive circuits 96Y, 96M, 96C, 96B in a way to be delayed a time T from the obtainment of the sync signal. By doing so, laser beams of the respective colors including the register patterns are exited.

By the exited respective laser beams, electrostatic latent images containing the register patterns are formed on the surfaces of the photosensitive drums 51Y, 51M, 51C, 51B. And the electrostatic latent images on the corresponding drum surfaces are developed by the developing agents to provide register pattern images of the respective colors on the corresponding drum surfaces. And the pattern images on the corresponding drum surfaces are sequentially transferred directly to the transfer belt 61 and the register patterns of the corresponding colors are formed on the transfer belt 61.

The register patterns of the respective colors on the transfer belt 61 are read out by the image sensor 67. The sensor detects, relative to the register pattern of the black (reference), shifts of the register patterns of the other colors. In the case where the register pattern of each color on the transfer belt cannot be read out by the image sensor 67, the controller 100 decides that no laser beam is exited from the respective laser beam source and that there occurs a light exposure error. And the controller 100 suspends a subsequent sheet from being supplied and displays the contents of the error via the operator panel 4.

Figure 8:
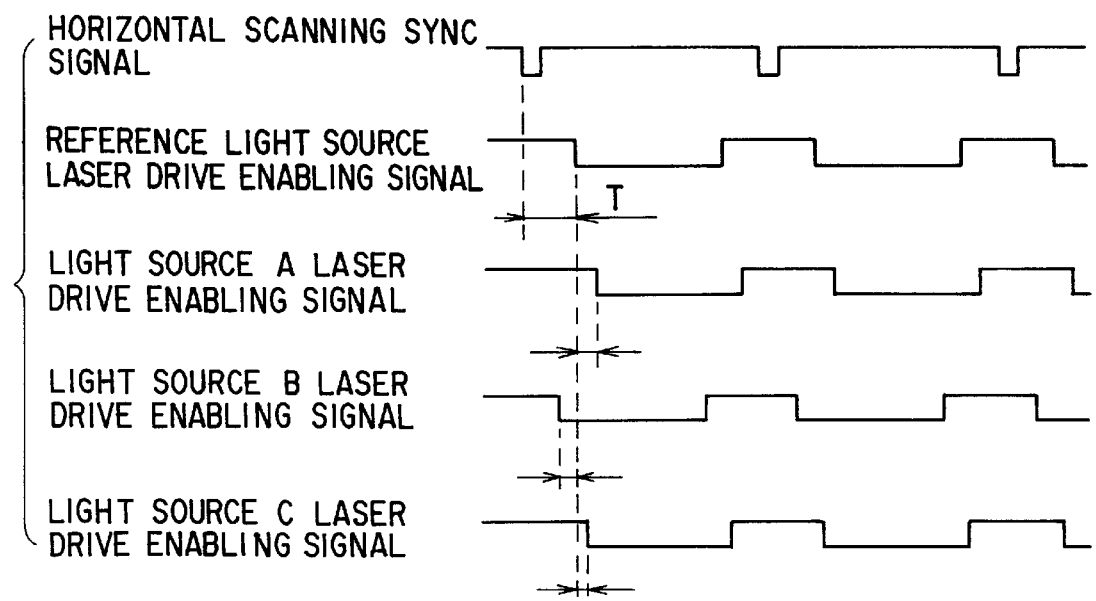
FIG. 8 is a timing chart showing timings of writing laser beams corrected by feeding back a relative shift among register patterns formed on drum surfaces on the basis of the timings of FIG. 7.

And the amount of shift of the register pattern is corrected as being set to be zero and a corresponding laser drive enabling signal of a write timing as shown, for example, in FIG. 8 is created. By doing so, the respective drive circuits 96Y, 96M, 96C, 96B are energized based on such signal to correct the write timings of the laser beams from the laser beam sources 42Y, 42M, 42C, 42B. Subsequent write timings of the laser beams from the respective laser beam sources 42Y, 42M, 42C, 42B are adjusted by such corrected timings, so that an image defect, such as a color misregister, does not emerge on the output image.

In the case where the write timings of the respective laser beams are corrected during the image forming operation, the register patterns are formed on the transfer belt 61 with the conveying sheet placed relative to the transfer belt. And the register patterns are read out by the image sensor 67 and, by doing so, it is possible to control the write timings of the respective laser beams. By correcting the write timings of the laser beams during the image forming operation in this way, it is possible to correct the misregister among the images caused by a variation in mounting angle of the optical members, such as the polygon mirror 91 and reflection mirror 95, resulting from their thermal aging.

As set out above, according to the present embodiment, use is made of a single polygon mirror 91 and a single light receiving element adapted to receive, as a reference beam, a portion of the laser beam 41B exited from the reference beam source 42B and a sync signal is obtained by the reference beam. In synchronism with the sync signal the register pattern of the respective color is output onto the transfer belt 61 and any amounts of shifts of the register patterns are detected by the image sensor 67. Further, the detected amounts of shifts are fed back to the drive circuits 96Y, 96M, 96C, 96B for energizing the respective beam sources 42Y, 42M, 42C, 42B and, by doing so, the write timings of the laser beams 41Y, 41M, 41C, 41B are corrected by setting the amounts of shifts of the register patterns to be zero.

According to the present embodiment, it is not necessary that a plurality of reflection mirrors and of light receiving elements be provided for detecting the write timings of writing laser beams of the respective colors in the horizontal scanning direction. It is, therefore, possible to manufacture an apparatus as a simpler and low-cost unit. Further, the write timings of writing the respective laser beams in the horizontal scanning direction are corrected by detecting amounts of shifts of the register patterns. It is, therefore, possible to easily and positively adjust the optical paths of the respective laser beams even if the accuracy of optical members or components as well as their mounting accuracys are lower.

The present invention is not restricted to the above-mentioned embodiment and various changes or modification of the present invention can be made without departing from the spirit and scope of the present invention. For example, although the laser beam source 42B for block is used as the reference beam, it is possible to use any of the laser sources of the other colors as the reference beam source.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-beam optical apparatus comprising:
    a plurality of light sources for emitting a plurality of respective laser beams;
    scanning means for scanning an image carrier by deflecting all of the laser beams emitted from the light sources, and for deflecting only a particular laser beam also in another direction, the particular laser beam being monitored so as to form a plurality of reference patterns;
    light receiving means for receiving the particular laser beam deflected in said another direction by the scanning means;
    sync signal generating means for generating a single sync signal based on the particular laser beam received by the light receiving means;
    first control means for causing the laser beams to be emitted from the light sources in response to the single sync signal to form said plurality of reference patterns on the image carrier;
    detecting means for detecting said plurality of reference patterns formed on the image carrier by the laser beams under control of the first control means; and
    second control means for detecting shifts in positions of detected reference patterns and thereby controlling the timings of emitting the laser beams from the light sources.

2. A multi-beam optical apparatus according to claim 1, wherein the first control means is provided for enabling the laser beams to be emitted at a time from the light sources on the basis of the single sync signal generated by the sync signal generating means.

3. A multi-beam optical apparatus according to claim 1, wherein the second control means is provided for controlling the timings of emitting the laser beams from the light sources so as not to produce a shift in the position of the reference patterns formed on the image carrier.

4. A multi-beam optical apparatus according to claim 1, wherein, when the reference patterns cannot be detected by the detecting means, the apparatus makes a decision of an error and is stopped.

5. A multi-beam optical apparatus according to claim 1, wherein the first control means causes the light sources to emit the laser beams to produce the reference patterns at one of a turn-ON time of the apparatus or at the ending of a warming-up operation immediately after the stopping of the apparatus, and
    wherein the second control means corrects the timing of emitting the laser beams on the basis of shifts in the positions of the reference patterns.

6. A multi-beam optical apparatus comprising:
    a plurality of light sources for emitting a plurality of respective laser beams;
    scanning means for scanning a plurality of image carriers provided correspondingly to the laser beams by deflecting all of the laser beams emitted from the light sources, and for deflecting only a particular laser beam also in another direction, the particular laser beam being monitored so as to form a plurality of reference patterns;
    light receiving means for receiving the particular laser beam deflected in said another direction by the scanning means;
    sync signal generating means for generating a single sync signal based on the particular laser beam received by the light receiving means;
    first control means for causing the laser beams to be emitted in response to the single sync signal to form said plurality of reference patterns respectively on the image carriers;
    detecting means for detecting amounts of relative shifts in positions of reference patterns formed on the image carriers by the laser beams under control of the first control means; and
    second control means for controlling timings of emitting the laser beams from the light sources on the basis of a result of detection made by the detecting means.

7. A multi-beam optical apparatus according to claim 6, wherein the first control means is provided for enabling the laser beams to be emitted at a time from the light sources on the basis of the single sync signal generated by the sync signal generating means.

8. A multi-beam optical apparatus according to claim 6, wherein the second control means is provided for controlling timings of emitting the laser beams from the light sources so as not to produce any relative shift in the positions of the reference patterns formed on the image carriers.

9. A multi-beam optical apparatus according to claim 6, wherein, when the reference patterns cannot be detected by the detecting means, the apparatus makes a decision of an error and is stopped.

10. A multi-beam optical apparatus according to claim 6, wherein the first control means causes the light sources to emit the laser beams to produce the reference patterns at a turning-ON time of the apparatus or at an ending of a warming-up operation immediately following the stopping of the apparatus, and
    wherein the second control means corrects the timings of emitting the laser beams on the basis of the amounts of shifts in the positions of the reference patterns.

11. An image forming apparatus comprising:
    a plurality of light sources for emitting a plurality of respective laser beams;
    scanning means for scanning an image carrier by deflecting all of the laser beams emitted from the light sources, and for deflecting only a particular laser beam also in another direction, the particular laser beam being monitored so as to form a plurality of reference patterns;
    developing means for supplying developing agents to the latent images formed on the image carrier to develop the latent images;

transferring means for transferring the developing agent images developed by the developing means onto a transfer medium;

fixing means for fixing, onto the transfer medium, the developing agent images which are transferred to the transfer medium by the transferring means;

light receiving means for receiving the particular laser beam deflected in said another direction by the scanning means;

sync signal generating means for generating a single sync signal based on the particular laser beam received by the light receiving means;

first control means for causing the laser beams to be emitted from the light sources in accordance with initially prepared pattern signals in response to the single sync signal, and causing said plurality of reference patterns to be formed on the image carrier;

detecting means for detecting said plurality of reference patterns that are formed on the image carrier under control of the first control means; and second control means for detecting a shift in positions of said plurality of the reference patterns on the basis of detecting results obtained by the detecting means, and thereby controlling timings for emitting the laser beams from the light sources.

12. An image forming apparatus according to claim 11, wherein the transferring means has a transfer belt for transferring the transfer medium along the image carrier, and wherein the reference patterns formed on the image carrier, after being transferred to the transfer belt, are detected by the detecting means arranged opposite the transfer belt.

13. An image forming apparatus according to claim 12, wherein the detecting means has an image sensor arranged a predetermined distance away from the transfer belt.

14. An image forming apparatus according to claim 11, wherein the first control means enables the laser beams to be emitted at a time from the light sources on the basis of the signal sync signal generated by the sync signal generating means.

15. An image forming apparatus according to claim 12, wherein the second control means is provided for controlling the timings of emitting the laser beams from the light source in order not to produce any shift among the reference patterns output onto the transfer belt.

16. An image forming apparatus according to claim 11, wherein, when the reference patterns cannot be detected by the detecting means, the apparatus makes a decision of error and is stopped.

17. An image forming apparatus according to claim 11, wherein the first control means is provided for causing the light sources to emit the laser beams at a turned-ON time of the apparatus or at an ending of a warming-up operation immediately following the stopping of the apparatus; and wherein the second control means corrects the timings of emitting the laser beams on the basis of the shift among the reference patterns.

18. An image forming apparatus comprising:

a plurality of light sources for emitting a plurality of respective laser beams based on an image signal;

scanning means for scanning each of a plurality of image carriers provided correspondingly to said plurality of laser beams by deflecting all of the laser beams emitted from the light sources, and for deflecting only a particular laser beam also in another direction, the particular laser beam being monitored so as to form a plurality of reference patterns;

developing means for supplying developing agents to a plurality of latent images formed on the corresponding image carriers by scanning said plurality of laser beams with said scanning means and thereby forming a plurality of developing agent images;

conveying means, having a conveying surface running along the image carriers, for holding and conveying a transfer medium on the conveying surface;

first transferring means for transferring the plurality of developing agent images which are developed by the developing means onto the transfer medium conveyed by the conveying means;

fixing means for fixing, to the transfer medium, developing agent images transferred by the first transferring means on the transfer medium;

light receiving means for receiving the particular laser beam deflected in said another direction by the scanning means;

sync signal generating means for generating a single sync signal based on the particular laser beam received by the light receiving means;

first control means for causing the light sources to emit laser beams in accordance with initially prepared pattern signals in response to the single sync signal generated by the sync signal generating means for forming said plurality of reference patterns on said plurality of image carriers, respectively;

second transfer means for directly transferring, to the conveying surface of the conveying means, reference patterns formed on the image carriers under control of the first control means;

detecting means, provided opposite the conveying surface, for detecting reference patterns transferred by the second transfer means to the conveying surface; and second control means for detecting relative shifts in positions of the reference patterns on the basis of a result of detection by the detecting means and thereby controlling timings of emitting the laser beams from the light sources.

19. An image forming apparatus according to claim 18, wherein the detecting means has an image sensor arranged a predetermined distance from the conveying surface.

20. An image forming apparatus according to claim 18, wherein the first control means enables the laser beams to be emitted at a time from the light sources on the basis of the single sync signal generated from the sync signal generating means.

21. An image forming apparatus according to claim 18, wherein the second control means controls the timings of emitting laser beams from the light sources in order not to produce any relative shift among the reference patterns transferred to the conveying surface.

22. An image forming apparatus according to claim 19, wherein, when a reference pattern cannot be detected on the conveying surface by the image sensor, the apparatus makes a decision of an error and is stopped.

23. An image forming apparatus according to claim 18, wherein the first control means causes the light source to emit the laser beams to produce reference patterns at a turn-ON time of the apparatus or at the ending of a warming-up operation immediately following the stopping of the apparatus; and wherein the second control means corrects the emitting timings of the laser beams on the basis of the relative shift among the reference patterns.

* * * * *